US006476761B2

(12) United States Patent
Martin et al.

(10) Patent No.: US 6,476,761 B2
(45) Date of Patent: Nov. 5, 2002

(54) DOMED DIVERGENT LENS FOR MICROWAVES AND AN ANTENNA INCORPORATING IT

(75) Inventors: Laurent Martin, Fontenilles (FR); Gérard Caille, Tournefeuille (FR); Agnès Lecompte, Launaguet (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/960,410

(22) Filed: Sep. 24, 2001

(65) Prior Publication Data

US 2002/0036587 A1 Mar. 28, 2002

(30) Foreign Application Priority Data

Sep. 25, 2000 (FR) ........................................... 00 12162

(51) Int. Cl.$^7$ ................................................ H04B 7/185
(52) U.S. Cl. ........................ 342/354; 343/909; 343/753
(58) Field of Search ................................ 342/354, 372; 343/909, 772, 753, DIG. 2

(56) References Cited

U.S. PATENT DOCUMENTS

| | | | | | |
|---|---|---|---|---|---|
| 4,156,878 | A | * | 5/1979 | Dion | 343/909 |
| 4,321,604 | A | | 3/1982 | Ajioka | |
| 5,818,395 | A | * | 10/1998 | Wolcott et al. | 343/753 |
| 6,018,316 | A | | 1/2000 | Rudish et al. | |

OTHER PUBLICATIONS

K. Probir et al, "Analysis of Rotationally Symmetric Arrays of Apertures on Conducting Spherical Surfaces", IEEE Transactions on Antennas and Propagation, IEEE Inc. NY, vol. 40, No. 8, Aug. 1, 1992 pp. 857–866.

* cited by examiner

*Primary Examiner*—Theodore M. Blum
(74) *Attorney, Agent, or Firm*—Sughrue Mion, PLLC

(57) ABSTRACT

A domed divergent microwave lens includes a plurality of waveguides with various lengths, the greatest length being that on the axis of the lens and the length being shorter for waveguides far from the axis. The axes of the waveguides are all parallel to each other and parallel to the axis of the lens, for example.

8 Claims, 3 Drawing Sheets

DOMED DIVERGENT LENS FOR MICROWAVES AND AN ANTENNA INCORPORATING IT

CROSS-REFERENCE TO RELATED APPLICATIONS

This application is based on French Patent Application No. 00 12 162 filed Sep. 25, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to a domed divergent lens for microwaves and an antenna incorporating it, the antenna being mounted onboard a satellite for communicating with terrestrial areas over a wide field of view.

2. Description of the Prior Art

In a telecommunication system using non-geosynchronous satellites in low Earth orbit or medium Earth orbit, the Earth is divided into areas or cells each of which has a diameter of several hundred kilometers, and terminals in an area communicate via a base station in that area. In other words, to set up a call between two terminals in the same area, the first terminal sends a signal to the base station via a communication system onboard a non-geosynchronous satellite, and the base station then transmits the call to the second terminal, again via a satellite. For communication between two terminals in two different areas, a call is set up between the two base stations of the two areas, for example via a terrestrial network.

Because it is necessary to minimize the weight and bulk of equipment onboard a satellite, it is preferable for a send or receive antenna to be assigned to a plurality of areas. The antenna must therefore cover a very wide field of view. For example, for a satellite at an altitude of 1400 km, the field of view has an angle at the apex of 108° for a telecommunications system whose coverage achieves an elevation of 10°.

Also, because the satellite is non-geosynchronous and the areas on the ground are fixed, the antenna must be a beam scanning antenna, i.e. the beam of the antenna must be in angular movement at all times. Finally, the difficulty of constructing this kind of antenna is increased by the fact that its gain must increase as a function of the pointing angle. As the pointing angle increases, the distance to the area increases, which causes attenuation due to the distance and to passing through the atmosphere.

To satisfy the above requirements, there has already been proposed an antenna including, on the one hand, an electronically scanned beam generator and, on the other hand, a dielectric domed divergent lens for increasing the field of view of the beam generator and correcting the gain as a function of the pointing angle. Splitting the beam generation function and the field of view increasing function with gain correction as a function of the pointing angle makes it possible to produce an antenna having an aperture angle from 60 to 120°. Also, the beam generator generally uses electronic scanning with a limited number of radiating elements. The dielectric domed divergent lens is made of a constant permittivity material onto which quarter-wave matching layers are molded.

However in practice a dielectric domed lens is incompatible with space applications because the dielectric materials are exposed to very high mechanical and thermal stresses during launch and in space. What is more, this kind of lens has a high mass, which is also difficult to reconcile with space applications.

SUMMARY OF THE INVENTION

The invention eliminates this drawback.

Thus the antenna according to the invention includes an electronically scanned array associated with a domed divergent lens to increase the field of view of the scanned array and the domed lens includes a plurality of metal waveguides with various lengths, the greatest length being that on the axis of the lens and the length decreasing toward the periphery.

Each waveguide constitutes a sensor/emitter and a phase-shifter, which provides the divergent lens function. As a waveguide is made up of simple metal walls, the antenna according to the invention is well suited to space applications.

The waveguides can have any section, such as a circular section, which is relatively easy to manufacture, a rectangular section or a hexagonal section, which has minimum losses.

In one embodiment the domed antenna is connected directly to a plane array of waveguides constituting the electronically scanned array. In this case, the number of waveguides in the array is the same as the number of waveguides in the lens and the waveguides of the plane array and of the domed lens are in one piece, for example.

The invention also relates to a domed divergent microwave lens including a plurality of waveguides with various lengths, the waveguides having a maximum length on the axis of the dome and the length decreasing as the distance from the axis decreases.

The invention therefore provides a domed divergent microwave lens including a plurality of waveguides with various lengths, the greatest length being that on the axis of the lens and the length being shorter for waveguides far from the axis.

In one embodiment the axes of the waveguides are all parallel to each other and parallel to the axis of the lens.

Alternatively, the axes of the waveguides converge at a point on the axis of the lens.

The lens is in the form of a body of revolution about an axis, for example.

All the metal waveguides preferably have the same section, for example a circular, rectangular or hexagonal section.

The invention also provides a send or receive antenna for a telecommunication system using non-geosynchronous satellites, the antenna being intended to form a set of fixed beams on the ground extending over a total angle of view from 60 to 120°, the antenna including an array of radiating elements scanned electronically to form beams corresponding to the various terrestrial areas and a domed divergent lens for enlarging the aperture of the beams created by the array of radiating elements and producing a gain that is at a minimum on the axis of the antenna and at a maximum at the periphery of the antenna, wherein the divergent lens includes a plurality of metal waveguides with various lengths, the greatest length being that on the axis of the lens and the length being shorter for waveguides far away from the axis.

In one embodiment the array of radiating elements includes the same number of waveguides as the domed divergent lens.

In one example, the radiating elements of the array of radiating elements each include a waveguide in one piece with a waveguide of the domed divergent lens.

In this case, in one embodiment, the waveguides of the array of radiating elements are extended by one or more sections for filter means on the side opposite the waveguides of the divergent lens.

Other features and advantages of the invention will become apparent from the following description of embodiments of the invention, which is given with reference to the accompanying drawings.

DETAILED DESCRIPTION OF THE PREFERRED EMBODIMENT

Figure 1:
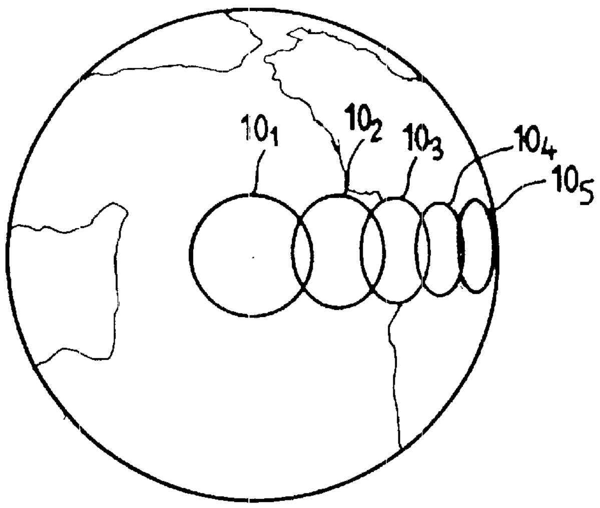
FIG. 1 shows the terrestrial globe and a few fixed areas for a telecommunication system to which the antenna in accordance with the invention is applied.

The antenna described with reference to the drawings is intended to be installed onboard a telecommunications satellite that is part of a constellation of non-geosynchronous satellites in an orbit at an altitude of approximately 1400 km. The antenna is intended to communicate with fixed terrestrial areas $\mathbf{10}_1$, $\mathbf{10}_2$, $\mathbf{10}_3$, $\mathbf{10}_4$, $\mathbf{10}_5$ (FIG. 1) each having a diameter of approximately 700 km.

Given that the satellite is non-geosynchronous, an electronically scanned antenna is used so that each send and receive beam corresponds to a fixed area on the ground at all times, despite the fact that the satellite is moving.

Figure 2:
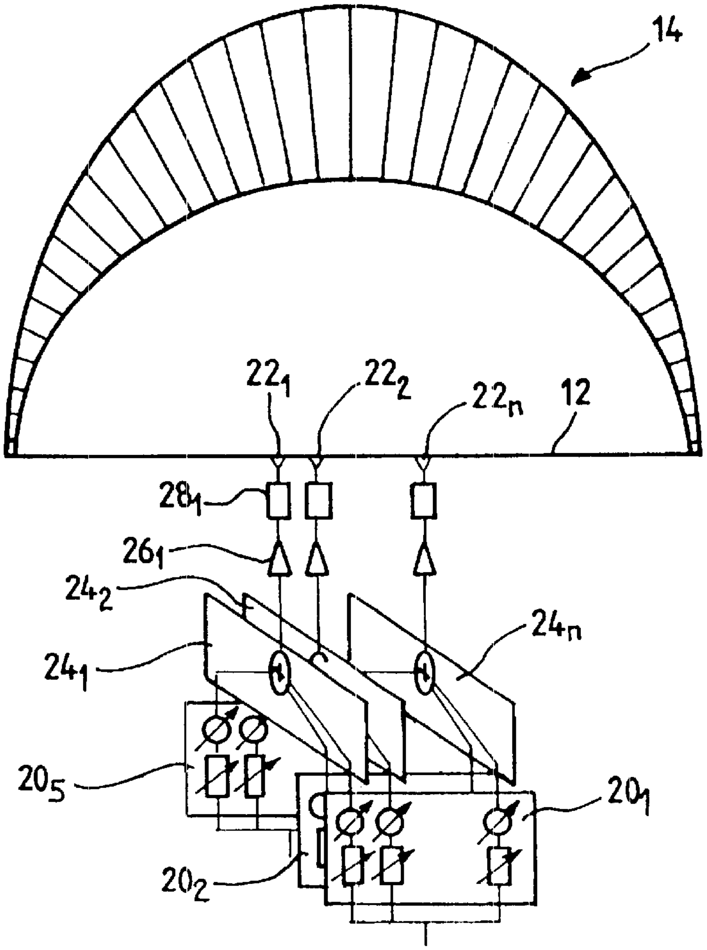
FIG. 2 is a diagram of a send antenna installed onboard a satellite for establishing communications with the terrestrial areas shown in FIG. 1.

Accordingly, as shown in FIG. 2, an array 12 of radiating elements is associated with a domed divergent lens 14. This is known in the art.

Figure 7:
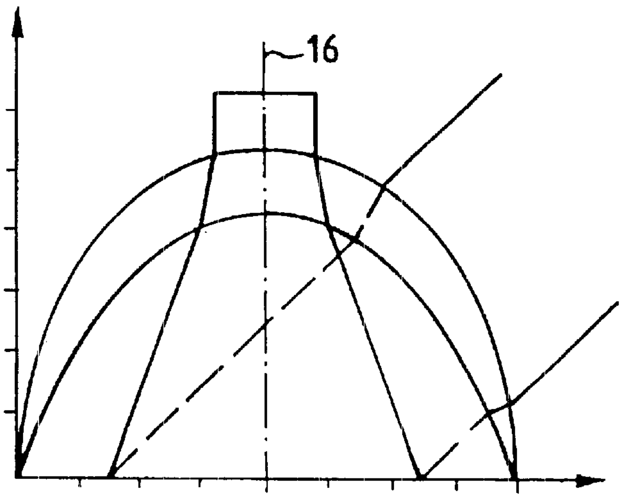
FIG. 7 is a diagram used to explain some properties of a domed divergent lens.

The array 12 performs the electronic scanning and also creates a plurality of beams for communicating with the areas $\mathbf{10}_1$ . . . $\mathbf{10}_5$. The domed lens 14 enlarges the field of view to an angle of approximately 120° so that the beam can cover all the areas $\mathbf{10}_1$ to $\mathbf{10}_5$. Also, as shown in FIG. 7, the beam obtained along the axis 16 of the domed lens is relatively narrow but its aperture cross section increases as the distance from the axis increases. The antenna is therefore more directional away from the axis, which provides correct coverage of areas far away from the axis, such as the area $\mathbf{10}_5$ in FIG. 1. Also, the divergent lens provides a higher gain as the distance from the axis 16 increases. For the areas $\mathbf{10}_5$ at the greatest distance from the antenna, this increase in gain compensates the increased attenuation due to the increased distance and increased atmospheric attenuation.

Beam-forming arrays $\mathbf{20}_1$, $\mathbf{20}_2$, . . . , $\mathbf{20}_5$ are provided in the conventional way to excite the array of radiating elements 12 to form the beams intended for the areas $\mathbf{10}_1$ to $\mathbf{10}_5$. Each beam-forming network $\mathbf{20}_i$ performs electronic scanning continuously so that the beam always reaches the assigned area.

Each of the beam-forming networks supplies to the radiating elements $\mathbf{22}_1$, $\mathbf{22}_2$, . . . , $\mathbf{22}_n$ a signal having an amplitude and a phase that are computed so that the overall beam corresponds to the required result. In other words, each network $\mathbf{20}_i$ has as many outputs as there are radiating elements. The outputs addressed to the same radiating element $\mathbf{22}_i$ of the array $\mathbf{20}_i$ are connected to a respective input of an adder or combiner $\mathbf{24}_1$, $\mathbf{24}_2$, . . . , $\mathbf{24}_n$ and the output of each adder is transmitted to the corresponding radiating element via an amplifier $\mathbf{26}_i$ and a filter $\mathbf{28}_i$.

Figure 3:
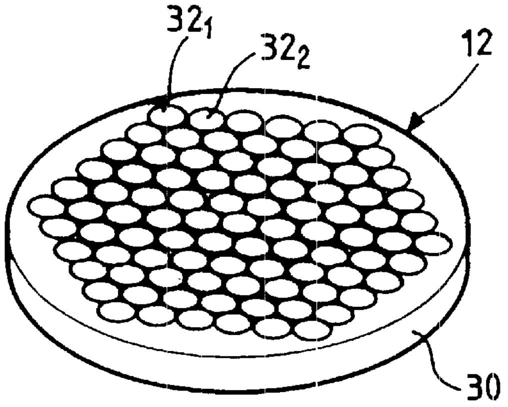
FIGS. 3 and 4 are diagrams of embodiments of parts of an antenna according to the invention.

In a first embodiment, shown in FIG. 3, the array 12 includes a thick metal plate 30 in which the radiating elements comprise simple circular through-holes $\mathbf{32}_1$, $\mathbf{32}_2$. This radiating array is particularly simple to manufacture.

Figure 4:
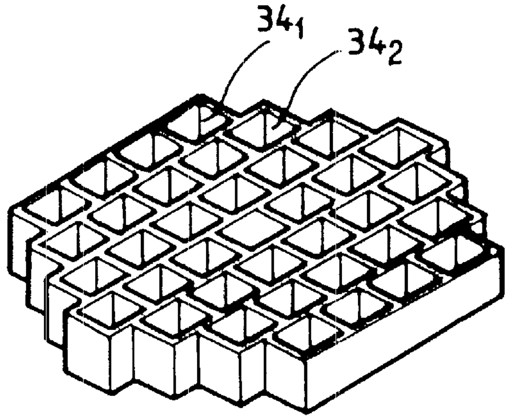

The embodiment shown in FIG. 4 also includes a thick metal plate, but the radiating elements are rectangular section holes $\mathbf{34}_1$, $\mathbf{34}_2$.

In another embodiment (not shown), the openings in the thick plate are hexagonal, which improves the radiation efficiency of the radiating elements.

For a given level of performance, the domed lens considerably reduces the total number of radiating elements in the active array. The reduction factor is at least 10. It also reduces the overall dimensions of the antenna. The number of radiating elements of the array is advantageously reduced to about 100, for example to a hexagonal array of 127 radiating elements.

Figure 5:
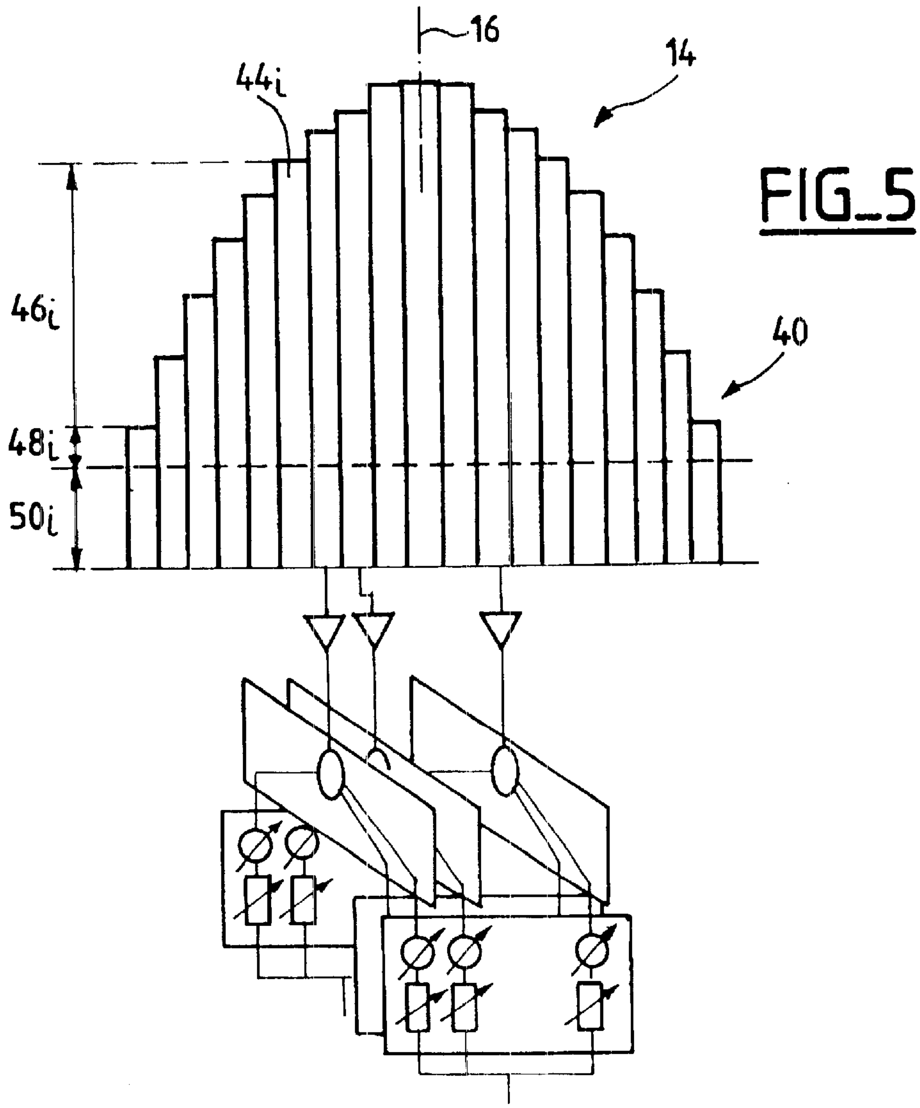
FIG. 5 is an overall diagram of a receive antenna according to the invention.
Figure 6:
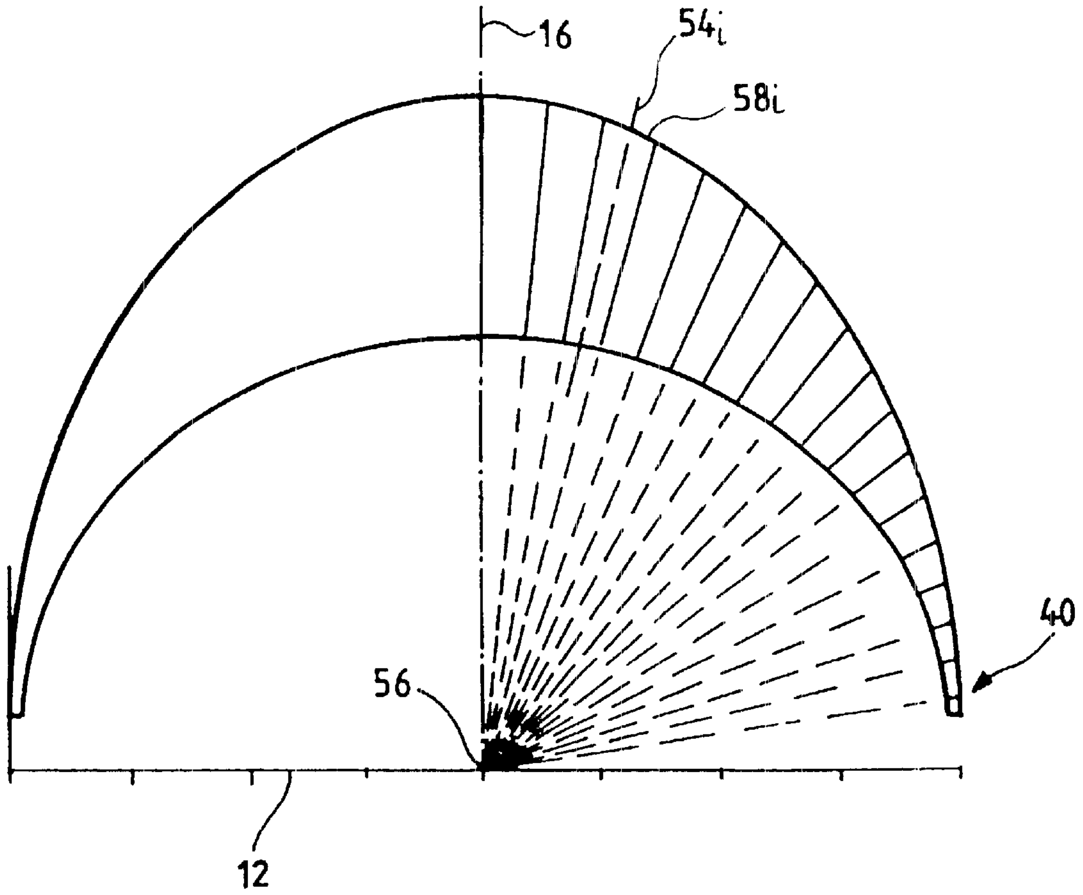
FIG. 6 is a diagram of a domed divergent lens according to the invention.

In accordance with an important aspect of the invention, the divergent lens 14 consists of a plurality of waveguides formed of metal members of various lengths, the greatest length being that along the axis of revolution 16 of the dome that the lens forms and the shortest length being that at the periphery 40 (see FIGS. 5 and 6). The different lengths of the various waveguides provide the necessary phase-shifts so that the domed lens constitutes a divergent lens.

In the embodiment of the invention shown in FIG. 5, the axes of all the waveguides are parallel to each other and parallel to the axis of revolution 16. In the embodiment of the invention shown in FIG. 6, the axes of the various waveguides converge at a point on the axis 16 and in the plane of the array 12.

Refer first to FIG. 5. In this example, the domed divergent lens 14 includes a plurality of waveguides with different lengths. The lens is in one piece with the radiating elements 22 and the filter means 28.

To be more precise, each waveguide $\mathbf{44}_i$ has three sections $\mathbf{46}_i$, $\mathbf{48}_i$ and $\mathbf{50}_i$. The first section $\mathbf{46}_i$ constitutes the part of the waveguide assigned to the divergent lens 14, the second section $\mathbf{48}_i$ constitutes the radiating array 12, and the third section $\mathbf{50}_i$ corresponds to the filter means for a receive (or send) antenna.

An antenna of this kind formed from metal waveguides is particularly simple to fabricate. In particular, it is sufficient to provide holes in a metal structure.

In the embodiment shown in FIG. 6, the axes $\mathbf{54}_i$ of the various waveguides converge at a point 56 on the axis 16 of the domed lens and are in a plane of the array 12 of radiating elements.

The number of holes forming a waveguide lens is typically a few hundred.

In all the embodiments of the invention that have been described, the exterior surface of the lens 14 is in the shape of an ellipsoid of revolution about the axis 16. Also, the various waveguides $\mathbf{44}_i$ (FIG. 5) or $\mathbf{56}_i$ (FIG. 6) are disposed around the axis 16 so that, in section on a plane perpendicular to the axis, the axes of the various waveguides are regularly distributed over a series of concentric circles centered on the axis 16.

The waveguide lens according to the invention can be used for applications other than that described above. In other words, the divergent lens with a plurality of waveguides is not necessarily used in combination with an electronically scanned array. Generally speaking, it is of benefit whenever it is necessary to obtain a wide field of view with the gain increasing as the distance from the axis increases.

For example, it can be used for payload telemetry for the purposes of controlling the satellite.

In this case, the lens has smaller dimensions than prior art lenses for the same application. For example, the lens is associated with a simple radiating horn. It focuses the energy in directions far away from the axis of the antenna, for example at angles up to at least 63°. The gain at 63° is higher than can be achieved with the antennas conventionally used for this type of application (horn with trap or formed reflector).

There is claimed:

1. A send or receive antenna for a telecommunication system using non-geosynchronous satellites, said antenna being intended to form a set of fixed beams on the ground extending over a total angle of view from 60 to 120°, said antenna including:

an array of radiating elements, scanned electronically to form beams corresponding to various terrestrial areas; and a domed divergent lens for enlarging the aperture of the beams created by said array of radiating elements said divergent lens including a plurality of metal waveguides with various lengths, the greatest length being that on an axis of said lens, and the length being shorter for waveguides far away from said axis, so that said divergent lens produces a gain that is at a minimum on said axis and at a maximum at a periphery of said lens.

2. The antenna claimed in claim 1 wherein said waveguides of said domed divergent lens have axes parallel to each other and parallel to said axis of said lens.

3. The antenna claimed in claim 1 wherein said axes of said waveguides converge at a point on said axis of said lens and in a plane of said array of radiating elements.

4. The antenna claimed in claim 1 wherein said waveguides of said domed divergent lens all have the same section.

5. A send or receive antenna for a telecommunication system using non-geosynchronous satellites, said antenna being intended to form a set of fixed beams on the ground extending over a total angle of view from 60 to 120°, said antenna including:

an array of radiating elements scanned electronically to form beams corresponding to various terrestrial areas; and a domed divergent lens for enlarging the aperture of the beams created by said array of radiating elements and for producing a gain that is at a minimum on an axis of said divergent lens and at a maximum at the periphery of said divergent lens, wherein said divergent lens includes a plurality of metal waveguides with various lengths, the greatest length being that on said axis of said lens and the length being shorter for waveguides far away from said axis; and wherein said array of radiating elements includes the same number of waveguides as said domed divergent lens.

6. The antenna claimed in claim 5 wherein said radiating elements of said array of radiating elements each include a waveguide in one piece with a waveguide of said domed divergent lens.

7. The antenna claimed in claim 6 wherein said waveguides of said array of radiating elements are extended by one or more sections for filter means on the side opposite said waveguides of said divergent lens.

8. The antenna claimed in claim 4, wherein said section is chosen from the group consisting of circular, rectangular and hexagonal sections.

* * * * *